US008259406B2

United States Patent
Kazusawa et al.

(10) Patent No.: US 8,259,406 B2
(45) Date of Patent: Sep. 4, 2012

(54) HEAD/DISK CONTACT DETERMINATION

(75) Inventors: Michiya Kazusawa, Kanagawa (JP);
Masayuki Kurita, Kanagawa (JP);
Kenji Kuroki, Kanagawa (JP);
Yoshihiko Maeda, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 19 days.

(21) Appl. No.: 12/964,543

(22) Filed: Dec. 9, 2010

(65) Prior Publication Data
US 2011/0141603 A1  Jun. 16, 2011

(30) Foreign Application Priority Data
Dec. 10, 2009  (JP) .................. 2009-280407

(51) Int. Cl.
*G11B 5/09* (2006.01)

(52) U.S. Cl. ........................................................ 360/46

(58) Field of Classification Search ............ 360/46, 360/75, 29, 31, 51, 70; 324/213; 704/270; 235/493
See application file for complete search history.

(56) References Cited

U.S. PATENT DOCUMENTS

| 5,202,801 | A  | * | 4/1993 | Fukuda | 360/70 |
| 6,042,014 | A  | * | 3/2000 | Zanetti | 235/493 |
| 6,278,567 | B1 | * | 8/2001 | Nagasawa | 360/51 |
| 6,650,497 | B1 | * | 11/2003 | Tada et al. | 360/75 |
| 7,180,692 | B1 | * | 2/2007 | Che et al. | 360/31 |
| 7,215,495 | B1 | * | 5/2007 | Che et al. | 360/31 |
| 7,634,411 | B2 | * | 12/2009 | Grubba | 704/270 |
| 7,889,447 | B2 | * | 2/2011 | Lee et al. | 360/29 |
| 2008/0007871 | A1 | | 1/2008 | Kiyono et al. | |
| 2008/0225430 | A1 | * | 9/2008 | Kawamoto et al. | 360/75 |
| 2009/0015962 | A1 | | 1/2009 | Daugela et al. | |
| 2010/0225310 | A1 | * | 9/2010 | Sudou | 324/213 |

FOREIGN PATENT DOCUMENTS

| JP | 07085410 | 3/1995 |
| JP | 2008016158 | 1/2008 |
| JP | 2008299897 | 12/2008 |
| JP | 2009020987 | 1/2009 |

* cited by examiner

*Primary Examiner* — Fred Tzeng

(57) ABSTRACT

A disk drive including a sensor element that senses contact between a head slider and a disk, a head integrated circuit (IC) comprising an amplification circuit section that amplifies a signal of the head slider, a controller IC comprising a controller that accesses a register of the head IC for controlling the head IC, and an identification section, within the head IC, that determines a contact frequency of the contact by the sensor element by using a timing control signal of the controller IC.

13 Claims, 7 Drawing Sheets

HEAD/DISK CONTACT DETERMINATION

CROSS-REFERENCE TO RELATED APPLICATION

This application claims priority from the Japanese Patent Application No. 2009-280407, filed Dec. 10, 2009, the disclosure of which is incorporated herein in its entirety by reference.

BACKGROUND

Spurious detection of head/disk contact lowers the performance of a hard disk drive (HDD). In particular, spurious detection of head/disk contact causes delay in read processing and write processing. Moreover, detection of head/disk contact adds to the number of transmission lines.

BRIEF SUMMARY OF THE INVENTION

A disk drive including a sensor element that senses contact between a head slider and a disk, a head integrated circuit (IC) comprising an amplification circuit section that amplifies a signal of the head slider, a controller IC comprising a controller that accesses a register of the head IC for controlling the head IC, and an identification section, within the head IC, that determines a contact frequency of the contact by the sensor element by using a timing control signal of the controller IC.

Figure 1:
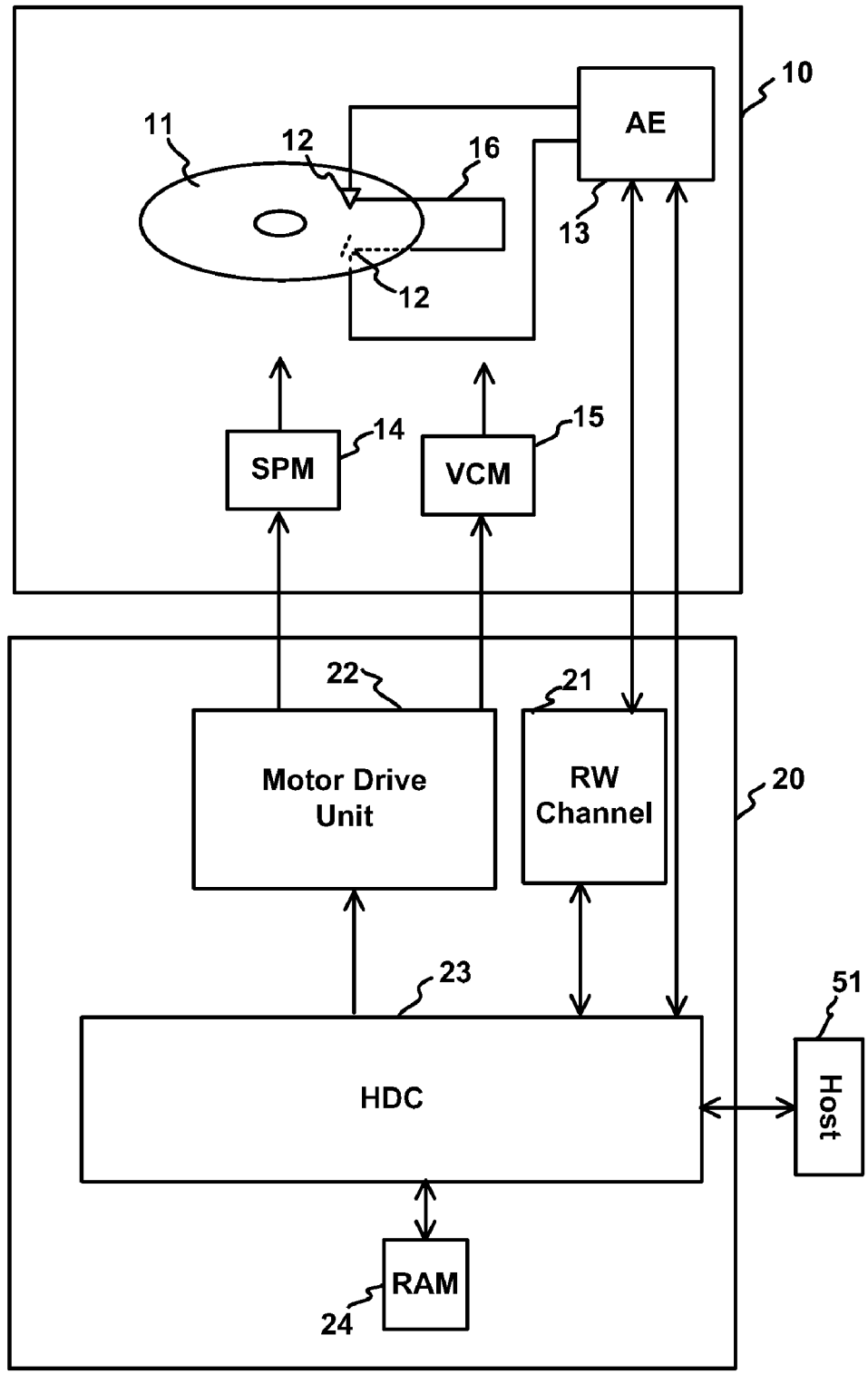
FIG. 1 illustrates an example of a HDD, in accordance with an embodiment of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

As disk drives, devices using disk drives of various different types, such as optical disks, magneto-optical disks, or flexible magnetic disks are known: of these, hard disk drives (HDDs) are very commonly employed as storage devices for computers. In addition, HDDs are employed in many applications apart from computers, such as video image recording/reproduction devices and car navigation systems.

The magnetic disks that are employed in HDDs comprise a plurality of data tracks; one or more data sectors are recorded in these data tracks. Also, magnetic disks comprise a plurality of servo tracks: these servo tracks comprise a plurality of servo sectors that are separated in the circumferential direction. A head element section of a head slider that is supported on a swingable actuator can perform data writing to the data sectors and data reading from the data sectors by accessing desired data sectors in accordance with servo data address information.

Typically, an HDD comprises an IC (packaged IC), including an amplification circuit that amplifies a head slider signal, provided in an enclosure. The IC is usually fixed in the vicinity of the axis of swinging of an actuator. Consequently, in this specification, this IC is termed a head IC or "arm electronics" (AE). The amplification circuit in the AE amplifies a user data signal and servo data signal that are read by the head slider, and, in addition, amplifies a user data signal that is written by the head slider. Apart from this amplification circuit, the AE incorporates logic circuitry in order to achieve high functionality.

The AE performs operations in accordance with instructions from the HDD controller. The IC (packaged IC) including the controller is typically mounted on a control circuit board that is fixed on the outside of the HDD casing. The AE is provided with registers and the controller controls the AE by storing control data in these registers. For example, the AE selects the head slider and alters the write current value or the sensing current value in accordance with instructions from the controller. Apart from this, another AE function is to supply power to a heater mounted on the head slider.

In order to improve recording density onto the magnetic disk, it is important to reduce the clearance between the magnetic disk and the head element that flies over the magnetic disk. In one embodiment, a heater on the head slider and to adjust the clearance by heating the head element with this heater.

This technique will be referred to as TFC (Thermal Flyheight Control). In TFC, heat is generated by supplying current to the heater and the head element is caused to project by means of thermal expansion that is thereby produced. In this way, the clearance between the magnetic disk and the head element can be reduced. In another embodiment, adjusting clearance between the head element and the magnetic disk is facilitated by a piezoelectric element.

In order to improve recording density, clearance between the head slider and the magnetic disk has continued to be reduced and the currently employed clearance is a few nanometers (nm). The currently employed clearance is a value close to the limit, taking into consideration the margins required in HDD manufacture. In various embodiments, a contact sensor element is mounted on the head slider, so as to sense contact between the magnetic disk and head slider in situ.

An HDD can cope with problems regarding head/disk contact in situ by having a contact sensor element mounted on the head slider or actuator and constantly monitoring contact of the head slider and the magnetic disk by using this element. For example, the HDD can control clearance in accordance with the head position by increasing the clearance, interrupting write processing, or maintaining the contact position. Consequently, the clearance margin between the head slider and the magnetic disk can be reduced by constantly monitoring contact between the head slider and the magnetic disk and, as a result, the clearance in read processing and write processing can be reduced.

In one embodiment, a contact sensor element is mounted on the head slider or actuator. In such an embodiment, the AE is provided with a receiver circuit (contact sensor circuit) of this sensor element. Unlike the control or channel circuit, the AE is arranged close to the actuator and head slider in the enclosure, thereby making it possible to increase the contact sensitivity of the contact sensor comprising a contact sensor element and contact sensor circuit.

In sensing of contact of the head slider and the magnetic disk, apart from the contacting sensor being able to sense contact with high sensitivity, it is important to be able to ascertain precisely that this is not spurious sensing (i.e. that head/disk contact is actually occurring). Spurious detection of head/disk contact causes delay in read processing and write processing and frequent spurious detection lowers the performance of the HDD. Also, the data transmission lines of the AE in the casing and of the controller IC outside the casing are arranged on the FPC (Flexible Printed Circuit) together with the data signal transmission line. Accordingly, the number of transmission lines on the FPC can be reduced, while performing accurate determination of head/disk contact.

In one embodiment, a disk drive includes: a head slider that accesses a disk; a sensor element that senses contact of said head slider and said disk; a head IC having an amplification circuit section that amplifies the signal of said head slider; a controller IC including a controller that accesses a register of said head IC for controlling said head IC; and a identification section, in said head IC, that determines the frequency of detection of said contact using said sensor element, by employing a timing control signal from said controller IC, that is shared with other functions of said head IC, and that determines whether or not to make an error report to said controller IC, by the frequency of detection of this contact. Thus, the number of transmission lines between the IC containing the sensor circuit that senses contact of the head slider and disk and the IC containing the controller is kept small and precise identification of head/disk contact is achieved.

In another embodiment, the timing control signal is synchronized with the control signal for servo sector reading on the disk. The servo sensor reading control signal is a synchronized signal, so a suitable sensing frequency can be determined without needing to employ an additional signal.

In a further embodiment, the identification section performs this error reporting to the controller IC by using a transmission line that is shared with that for other errors. In this way, the number of transmission lines can be reduced.

In yet another embodiment, the identification section is provided with a counter that counts the number of times that contact is sensed by the sensor element and the identification section determines the frequency of contact sensing by using the count value of this counter and the timing control signal. In this way, the contact sensing frequency can be accurately determined by a simple construction.

In one embodiment, the counter clears the count value every time a prescribed time specified by the timing control signal has elapsed in respect of the measurement time, and the identification section decides to perform error reporting when this count value reaches a threshold value. In this way, precise contact error reporting can be achieved by simple processing.

In another embodiment, the identification section decides on whether or not to perform error reporting by comparing the frequency of sensing contact that is thus determined with a threshold value, this threshold value being a programmable parameter. In this way, an appropriate decision regarding contact can be made, depending on the construction or condition of the disk drive.

In a further embodiment, the identification section is provided with a counter that counts the number of times that contact is sensed by the sensor element and the counter clears the count value every time a prescribed time specified by the timing control signal has elapsed in respect of the measurement time, and the identification section decides to perform error reporting when this count value reaches a threshold value, this prescribed elapsed time and/or threshold value being programmable parameters. In this way, an accurate decision regarding contact can be made, depending on the construction or condition of the disk drive, by simple processing.

In another embodiment, the head IC performs power save mode control using the timing control signal. In this way, the types of timing control signal that are employed in head IC control can be reduced and head IC control can be achieved by a simpler construction.

In one embodiment, a disk drive is a HDD. In this embodiment, the circuitry for detecting contact between the head slider and magnetic disk has special characteristics.

In the HDD according to the present embodiment, the IC including the circuit that amplifies the head slider signal comprises a contact sensing circuit that senses contact between the head slider and the magnetic disk. The contact sensing circuit determines the contact frequency of the head slider and the magnetic disk using the timing control signal from the controller. The contact sensing circuit reports an error to the controller if the frequency with which contact is made exceeds the threshold value.

By performing contact identification and error reporting in terms of contacting frequency, lowering in performance due to spurious detection of contact can be avoided. Also, the IC employs the timing signal referred to above in other functions also. In this way, by using a timing control signal that is shared with different functions, the number of transmission lines between this IC and the IC including the controller can be reduced.

The overall construction of an HDD in which is mounted a circuit for sensing contact between the head slider and the magnetic disk according to the present embodiment will now be described. FIG. 1 is a block diagram showing the overall construction of the HDD 1. The HDD 1 comprises a circuit board 20 that is fixed to the outside of an enclosure 10. On the circuit board 20, there are mounted various circuits such as the hard disk drive controller (HDC) 23 and RAM 24, comprising a read/write channel (RW channel) 21, motor drive unit 22, MPU and logic circuits. The circuits are formed on a single IC (packaged IC) or on different ICs (packaged ICs).

In the enclosure 10, the spindle motor (SPM) 14 rotates the magnetic disk 11 with a prescribed angular speed. The magnetic disk 11 is a disk that stores data. A motor drive unit 22 drives the SPM 14 in accordance with control data from the HDC 23. Each head slider 12 comprises a slider that flies over the magnetic disk and a head element section that is fixed to the slider and that performs conversion between magnetic signals and electrical signals (data reading/writing).

Figure 2:
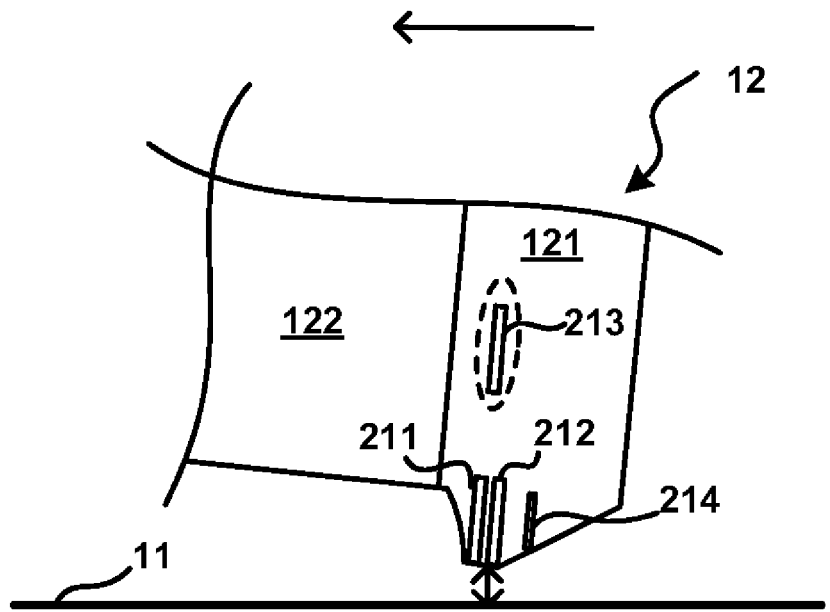
FIG. 2 illustrates an example of a head slider, in accordance with an embodiment of the present invention.

FIG. 2 is a view showing diagrammatically the construction of the head slider 12. The head slider 12 comprises a slider 122 and an element section 121 that is formed at the trailing end face thereof. The element section comprises a read element 211, a write element 212, heater element 213 and a contact sensor element 214. The head slider 12 flies over the magnetic disk 11.

The heater element 213 adjusts the clearance between the head element section 121 and the magnetic disk 11 by producing expansion/projection of the head element section 121 by means of heat. This heater element 213 constitutes a clearance actuator that adjusts the clearance between the head element section 121 and the magnetic disk 11. Apart from clearance actuators using a heater element, clearance actuators are also known using for example electrostatic force between the magnetic disk 11 and head slider 12, or a piezoelectric element. The piezoelectric element is arranged on the head slider 12 or actuator 16.

The contact sensor element 214 may be for example a resistance element. When the head element section 121 contacts the magnetic disk 11, the resistance value of the resistance element changes. Contact between the head slider 12 and the magnetic disk 11 can be sensed by measuring this change of resistance value. For example, the contact sensor element may be constituted by a piezoelectric element. In one embodiment that the contact sensor element 213 is formed on the head slider 12. In another embodiment, the contact sensor element 213 is formed on the actuator 16.

Returning to FIG. 1, the head slider 12 is fixed at the tip of the actuator 16. The actuator 16 is linked with a voice coil motor (VCM) 15, so that the head slider 12 is moved in the radial direction on the rotating magnetic disk 11 by rotation about the rotary shaft thereof. A motor driver unit 22 drives the VCM 15 in accordance with control data from an HDC 23.

The arm electronics (AE) 13 constituting the head IC is an IC (packaged IC) arranged inside the enclosure 10. Typically, the AE 13 is fixed in the vicinity of the rotary shaft of the actuator 16. The AE 13 selects a head slider 12 for accessing (reading or writing) the magnetic disk 11 from several head sliders 12, in accordance with control data from the HDC 23, and performs amplification of the read/write signal.

Also, the AE 13 functions as a power supply adjustment circuit that supplies power to the heater of the head slider 12 that is selected in accordance with the control data from the HDC 23 and adjusts the amount of power thereof. Also, the AE 13 has a contact sensing function of sensing contact by monitoring for contact between the head/slider 12 and the magnetic disk 11, using a contact sensor element 214. In this embodiment, this contact sensing function of the AE 13 has special features. This aspect will be described later.

In read processing, the RW channel 21 extracts data from the read signal supplied from the AE 13 and performs decoding processing thereon. The decoded data is supplied to the HDC 23. Also, in write processing, the RW channel 21 performs code modulation of the write data supplied from the HDC 23 and, in addition, converts this code-modulated data to a write signal, which it supplies to the AE 13.

The HDC 23 is the controller of the HDD 1 and comprises an MPU and hardware logic circuitry. The MPU operates in accordance with firmware loaded in the RAM 24. The HDC 23 executes overall control of the HDD 1 and necessary processing relating to data processing, such as read/write process control, management of the order of execution of commands, head positioning control (servo control) using the servo signal, interfacing control with a host 51, defect management and error handling processing.

Figure 3:
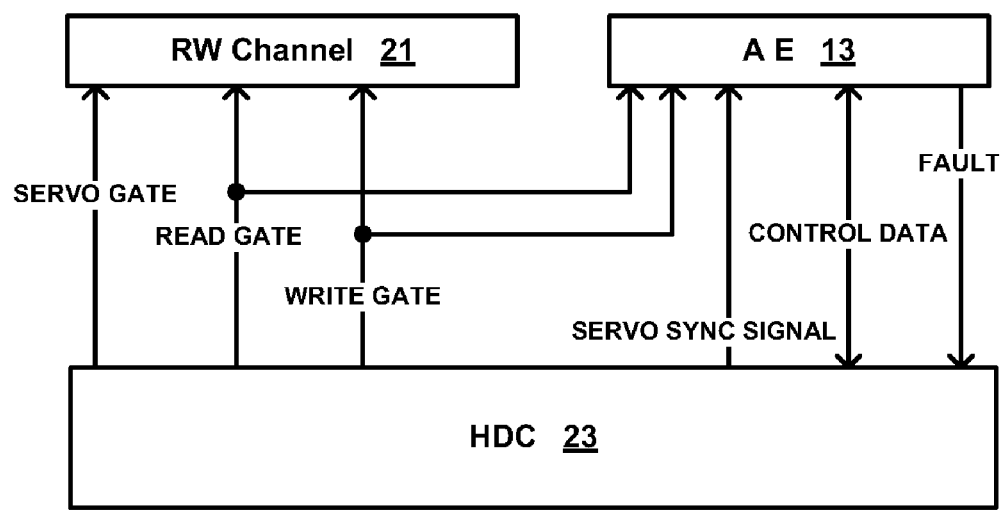
FIG. 3 illustrates an example of control signals between the HDC and RW channels and the control signals between the HDC and AE, in accordance with an embodiment of the present invention.

The HDC 23 controls the operation of the AE 13 by setting control data in registers of the AE 13. FIG. 3 shows the control signals between the HDC 23 and RW channel 21 and the control signals between the HDC 23 and AE 13. The mode of the RW channel 21 is changed in accordance with a gate signal from the HDC 23. While the servo gate signal is enabled, read processing of the servo data is performed; while the read gate signal is enabled, read processing of user data is performed; while the write gate signal is enabled, write processing of the user data is performed.

The write gate signal is also delivered to the AE 13. The AE 13 comprises a write circuit (driver circuit of the write element 212), whereby the write signal from the RW channel 21 is amplified and output to the write element 212. The output of the AE 13 is turned ON/OFF in accordance with the write gate signal. Also, the AE 13 is provided with a read circuit: this read circuit comprises a circuit that supplies sensing current to the read element 211 and a receiver circuit (amplification circuit) that receives a signal from the read element 211. The signal from the read element 211 is thereby amplified and delivered to the RW channel 21. The read signals of the user data and servo data are delivered to the RW channel 21 through the receiver circuit.

The HDC 23 controls the AE 13 by storing control data in the control registers of the AE 13. The AE 13 is actually provided with a control register set comprising a plurality of control registers. The AE 13 selects a head slider 12 in accordance with the values set in these control registers, or supplies to the head slider 12 write current or sensing current of the value set by the register. Also, the AE 13 supplies, to a heater element 213 of the head slider 12, heater power of the value indicated by the data that was set in the register in question by the HDC 23.

The HDC 23 supplies to the AE 13 a signal (SERVO SYNC SIGNAL) synchronized with the servo gate signal. This signal may be the same signal as the servo gate signal. Several methods of employing the servo gate synchronization signal are available. In one embodiment, the AE 13 performs power saving control using the servo gate synchronization signal. Under the control of the servo gate synchronization signal, the AE 13 sets circuits that are not required in sleep mode. For example, in write processing of user data, the AE 13 performs ON/OFF control of the read circuit in accordance with the servo gate synchronization signal. Furthermore, in read processing of user data by the HDC 23, the AE 13 may perform ON/OFF control of the write circuit in accordance with the servo gate synchronization signal.

Alternatively, the HDC 23 may switch the user data read parameter and the servo data read parameter by using the servo gate synchronization signal. The receiver circuit of the read element 211 operates in accordance with the read parameter. For example, noise may be reduced by setting the filter settings to respectively optimal values for the user data and servo data.

In this embodiment, the AE 13 uses this servo gate synchronization signal in ascertaining contact of the head slider 12 and the magnetic disk 11. When the AE 13 ascertains that head/disk contact is taking place, it reports this to the HDC 23, using a fault signal. The fault signal is delivered to the HDC 23 as an interrupt. The HDC 23 thereupon commences processing for dealing with the head/disk contact.

The number of transmission lines between the AE 13 and the HDC 23 is made as small as possible. In one embodiment, the fault signal line is also employed for reporting other errors detected by the AE 13. For example, when an error such as open circuiting/short-circuiting of the element of the head element section 121, or no input of the input signal occurs, the AE 13 reports occurrence of an error to the HDC 23 by means of the fault signal. In addition, the AE 13 sets an error number indicating the content of the error in the control register. The HDC 23 acquires the error number by accessing the control register and performs processing for dealing with the error indicated by this number.

Figure 4:
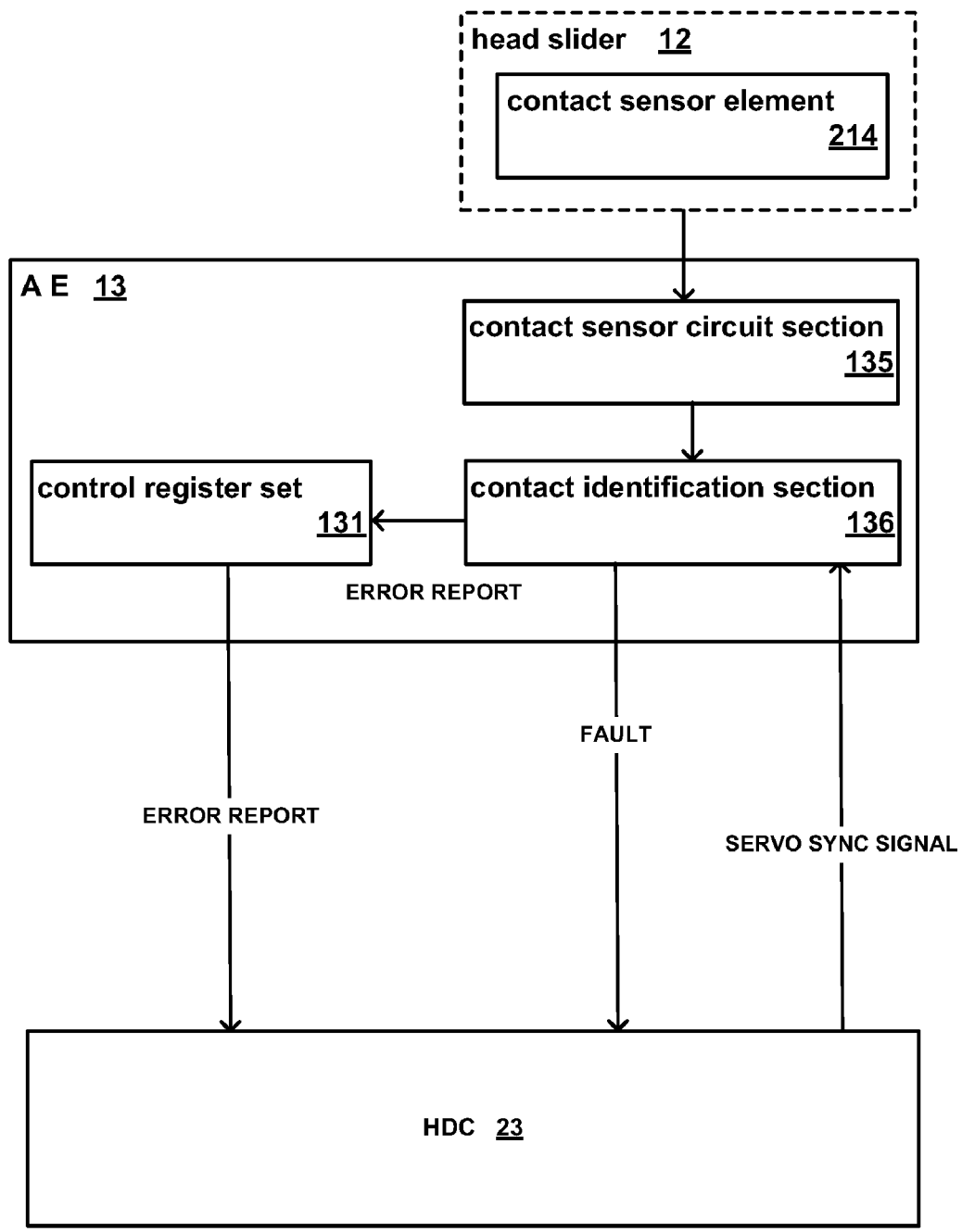
FIG. 4 illustrates an example of structural elements relating to contact sensing processing performed by the AE, in accordance with an embodiment of the present invention.

FIG. 4 is a block diagram showing the structural elements relating to contact sensing processing performed by the AE 13. The AE 13 comprises a control register set 131, a contact sensor circuit section 135 and a contact identification section 136. The control register set 131 comprises a plurality of registers: each register stores different control data. For example, in the register set 131, the selected head slider, the write current value, the sensing current value, the heater power value or error number etc are stored in respective registers. Each register is specified by a register address.

The construction in the AE 13 for sensing contact of the head slider 12 and the magnetic disk 11 comprises a contact sensor circuit section 135 and contact identification section 136. The contact sensor circuit section 135 comprises a contact sensor element 214 and contact sensor section. The contact sensor circuit section 135 identifies sensing of contact by the contact sensor element 214 by using the signal from the contact sensor element 214 on the head slider 12.

The contact identification section 136 identifies whether sensing of contact by the contact sensor element 214 and the contact sensor circuit section 135 (contact sensor section) is caused by actual contact between the head and disk. In this way, the accuracy of sensing head/disk contact can be raised by evaluating whether or not contact sensing by the contact sensor section is due to actual head/disk contact, and the drop in performance due to spurious sensing can thereby be reduced.

When the contact identification section 136 identifies that actual contact is taking place between the head slider 12 and the magnetic disk 11, it reports an error to the HDC 23 by using a fault signal. Furthermore, the contact identification section 136 stores the error number corresponding to head/disk contact in the control register. The HDC 23 then accesses the register in which the error number corresponding to the fault signal is stored and can thereby perform processing to deal with the head/disk contact error indicated by the error number.

Typically, the HDD 1 is provided with a plurality of head sliders 12. The AE 13 is provided with contact sensor circuit sections 135 respectively corresponding to these head sliders 12, or with a common contact sensor circuit section 135 for all (or some) of the head sliders 12. In one embodiment, the contact identification section 136 is common to all of the head sliders 12. In this way, the size of the circuitry can be reduced.

Figure 5:
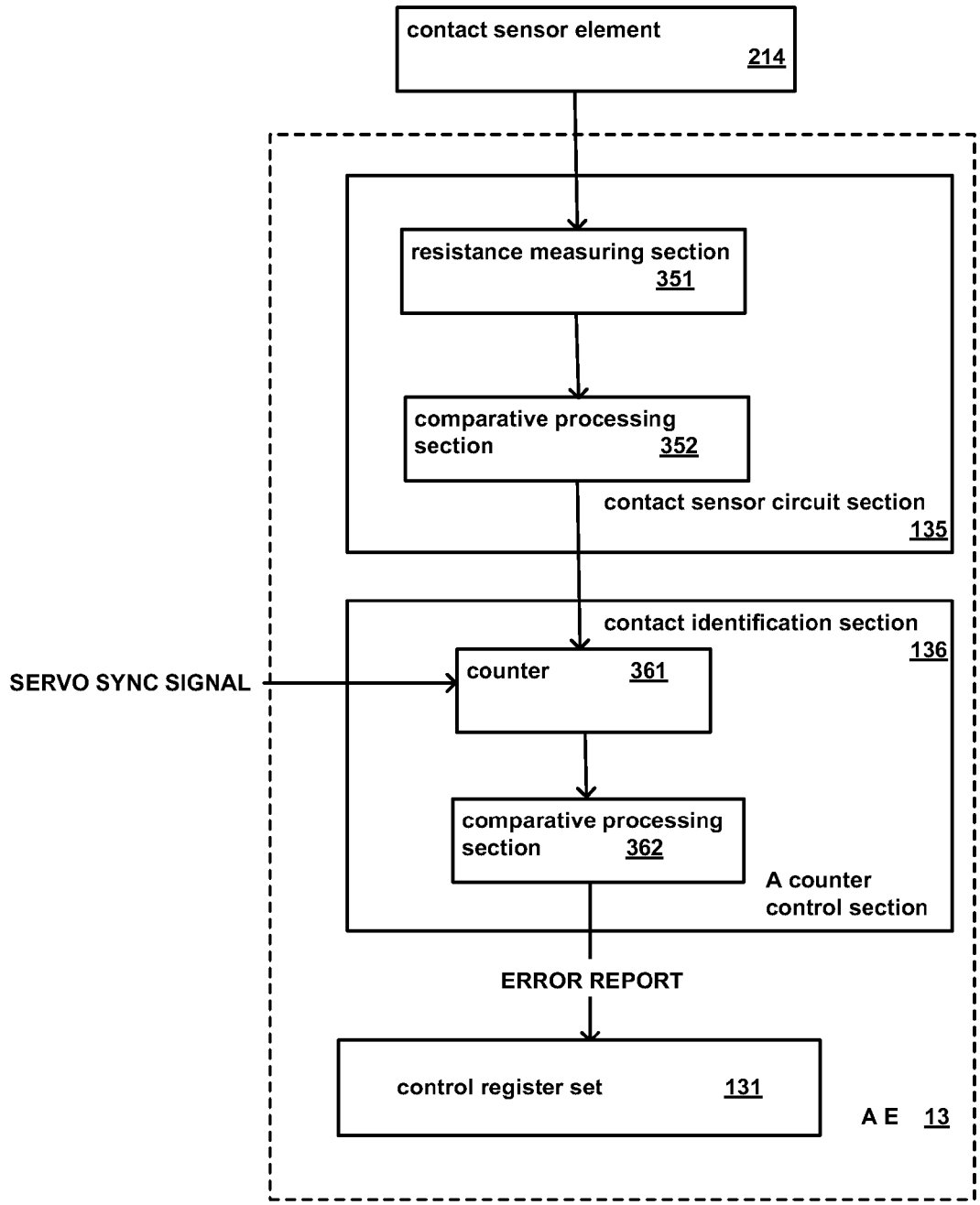
FIG. 5 illustrates an example of a contact sensor circuit section and contact identification section, in accordance with an embodiment of the present invention.

FIG. 5 is a block diagram showing the construction of the contact sensor circuit section 135 and contact identification section 136. The contact sensor circuit section 135 is provided with a resistance measurement section 351 and a comparative processing section 352. The resistance measurement section 351 measures the resistance of the contact sensor element 214. The comparative processing section 352 compares the measured resistance value (typically, the amount of change of the resistance) of the contact sensor element 214 with a prescribed threshold value.

The (change in) resistance value is typically measured by supplying a constant current or constant voltage to the contact sensor element 214 and measuring the voltage or current. The contact identification section 136 comprises a counter 361 and comparative processing section 362. The counter 361 counts the number of times that the measured value of the resistance of the contact sensor element 214 exceeds the threshold value. The comparative processing section 362 compares the value of the counter with a predetermined threshold value.

In one embodiment, the contact sensor element 214 is a resistor element. The resistance value of the contact sensor element 214 is changed by head/disk contact. In general, the resistance value of the contact sensor element 214 is increased by the rise in temperature produced by contact. The resistance measurement section 351 monitors the resistance of the contact sensor element 214. The comparative processing section 352 compares the resistance value (typically, the amount of change of resistance) of the contact sensor element 214 measured by the resistance measurement section 351 with the threshold value and, if the resistance measurement value exceeds the threshold value, reports this fact to the contact identification section 136. In this way, the contact sensor circuit 135 monitors the resistance of the contact sensor element 214 and thereby senses change in resistance of the contact sensor element 214 produced by head/disk contact.

In the contact identification section 136, the counter 361 counts reports from the comparative processing section 351. In other words, it counts the number of times that head/disk contact is sensed by the contact sensor circuit section 135. The counter 361 receives the servo gate synchronization signal from the HDC 23. When the (change of the number of) cycles of the servo gate synchronization signal reaches a predetermined number of times, the count value of the counter 361 is cleared.

When the comparative processing section 362 of the contact identification section 136 finds that the count value of the counter 361 has reached a prescribed value, it stores an error number indicating that head/disk contact has occurred in a register of the control register set 131. The comparative processing section 362 reports occurrence of an error to the HDC 23 by a fault signal. The appropriate value of the contact frequency that should be used as a criterion for error reporting may change depending on the HDD design, differences of individual HDDs, or the time for which the HDD has been used, etc.

It should be appreciated that the value of the contact frequency to be used as a criterion for error reporting should be programmable. In this example, the predetermined value (threshold value) referred to above that is accessed by the comparative processing section 362 and/or the time (number of cycles of the servo gate synchronization signal) at which the counter 361 clears its count value are programmable parameters. A test device of the HDC 23 or HDD 1 is used to store these threshold values in the control register set 131: these predetermined values (threshold values), which are programmable parameters, are set in the control register set 131.

Figure 6:
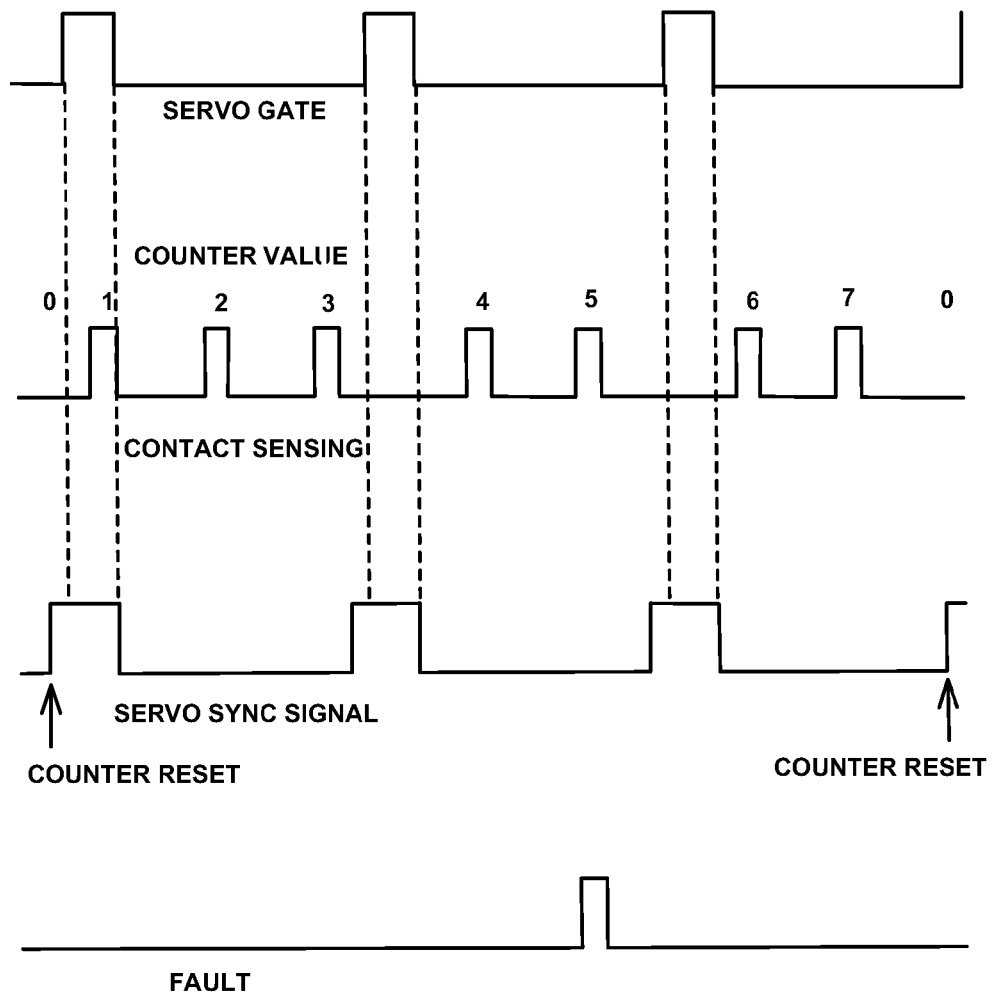
FIG. 6 illustrates an example of a timing chart, in accordance with an embodiment of the present invention.

FIG. 6 is a timing chart showing an example of the timings of the servo gate signal, contact sensing reporting from the comparative processing section 352 in the contact sensor circuit section 135, the count of the counter 361, the servo gate synchronization signal, and error notification to the HDC 23 of the contact identification section 136 by a fault signal. The rise of the servo gate synchronization signal coincides with the timing of the servo gate signal: this rise occurs earlier than the servo gate signal.

The count value of the counter 361 is cleared on every third rise of the servo gate synchronization signal. The contact sensor circuit section 135 reports error generation to the HDC 23 when the count value of the counter 361 reaches 5. The contact sensor circuit section 135 reports error generation, by means of a fault signal, to the HDC 23 if contact is sensed five times prior to counter clearing. These numerical values are merely examples given by way of explanation. In an actual HDD, it may be arranged that head/disk contact is deemed to have occurred when for example the number of contacts sensed exceeds 100 in one disk revolution.

As described above, the count value of the counter 361 is cleared when the servo gate synchronization signal changes cyclically a predetermined number of times (in the above example, when the number of rises is three times). The servo gate signal changes cyclically in accordance with rotation of the magnetic disk 11. The number of cyclic changes corresponds to the elapsed time. The contact identification section 136 deems contact of the head slider 12 and the magnetic disk 11 to have actually occurred if the number of times that head/disk contact is sensed reaches a prescribed threshold value within a prescribed time (prescribed number of times of change of the servo gate signal per cycle).

By thus arranging for the contact identification section 136 to identify actual head/disk contact using the frequency of sensing of contact of the head slider 12 and the magnetic disk 11, spurious detection of contact of the head slider 12 and the magnetic disk 11 can be reduced and more accurate detection of head/disk contact can be achieved.

As described above, to achieve measurement of the frequency of contact sensing (number of times of sensing per unit time), a function of counting the number of times of sensing and a signal serving as a criterion of the elapsed time are required. In this embodiment, the AE 13 employs the servo gate synchronization signal for measurement of the frequency of contact sensing. The servo gate signal is synchronized with rotation of the magnetic disk 11 and is thus ideal as a timer for measuring the frequency of contact sensing.

A characteristic feature of this embodiment is that the AE 13 employs the servo gate synchronization signal for another function. Specifically, as described above, it would be possible for the AE 13 to employ the servo gate synchronization signal for power saving control or for control of the timing of changeover of the parameter setting. In this way, by employing a timing control signal that is shared with another function, measurement of the frequency of contact sensing can be performed without increasing the number of transmission lines between the AE 13 and HDC 23 and without adding a fresh signal.

The counter 361 counts the number of times of contact sensing. In the above example, when a prescribed time as measured by the servo gate synchronization signal has elapsed, the counter 361 clears the count value. In one embodiment, a small counter number and simple processing are utilized. In the above example, calculation of the contact sensing frequency before and after clearing of the counter 361 is separated.

It is also possible for the contact identification section 136 to perform measurement of contact sensing frequency by another method. For example, the contact identification section 136 may be provided with counters of the same number (three cycles in the case of the example of FIG. 6) as the cycle number employed for calculation of the contact frequency, so that the number of times of sensing contact in each cycle is counted by a different counter. Every time one cycle has elapsed, the value of the oldest count is cleared. The cleared count is taken as the count of the number of times contact is sensed in the most recent cycle. If the total of the count values of all the counters exceeds the threshold value, the contact identification section 136 deems that actual head/disk contact has occurred.

In one embodiment, time measurement for measurement of the frequency of contact sensing is performed by making use of the servo gate synchronization signal from the HDC 23. However, the AE 13 may employ a signal that is different from this. The signal that is employed is a timing control signal that is employed for some other function also in the AE 13. In another example of the shared timing control signal, this signal may be the clock signal that is employed in serial transmission in accessing the control register set 13 of the AE 13.

Figure 7:
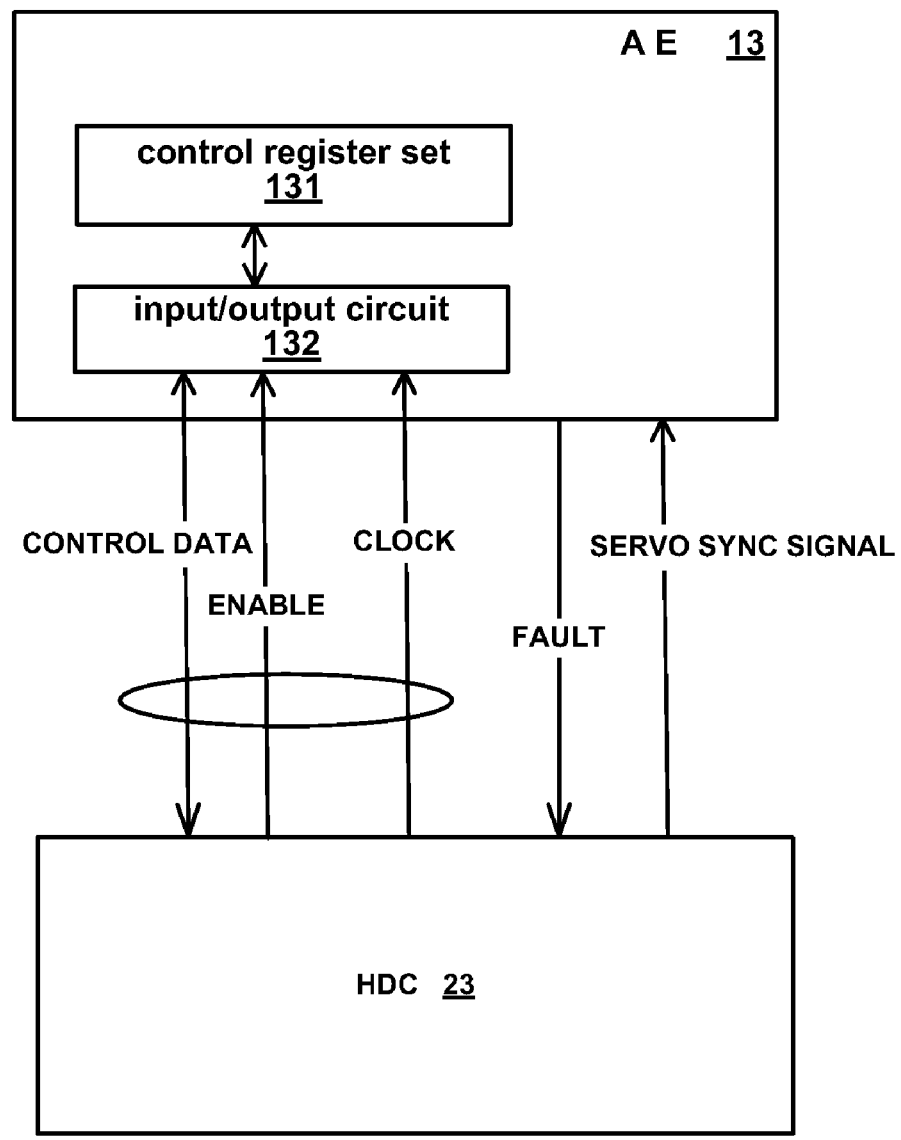
FIG. 7 illustrates an example of an interface between the AE and HDC, in accordance with an embodiment of the present invention.

In another embodiment, connection between the HDC 23 and the AE 13 is effected using a serial interface. FIG. 7 is a block diagram of the interface of the AE 13 and HDC 23. The AE 13 is provided with an input/output circuit 132 for input/output of control data of the control register set 131. The input/output circuit 132 and the HDC 23 are connected by the serial interface. The transmission line group of the serial interface includes an enabling signal line, clock signal line and a serial data line.

As described above, the signal transmission lines between the AE 13 and HDC 23 are formed on an FPC that connects these. The HDC 23 can store control data in the control register set 131 and can read control data stored in the register set 131 through the serial transmission line group and an input/output circuit 132. When writing to the register, the HDC 23 transmits control data, and when reading, the HDC 23 acquires data from the AE 13. In serial data transmission between the HDC 23 and the AE 13, the register data becomes active in response to a change in the enabling signal.

In this construction, the HDC 23 continues to transmit the clock signal to the AE 13 not only in the period of accessing the control register set 131, but also in other periods. The AE 13 measures the time by using this clock signal and in this way can determine the contact sensing frequency. In this way, the AE 13 can perform measurement of the contact sensing frequency by employing the clock signal in serial transmission between the control register set 131 and the HDC 23, without needing to add a signal transmission line between the AE 13 and HDC 23.

In various embodiments, processing by the AE could be applied to disk drives employed in disks other than magnetic disks. The IC including the HDC could be arranged within the casing. The IC including the HDC may contain other circuit constituents, such as an RW channel or RAM. The number of magnetic disks of the HDD to which the present invention may be applied is not restricted and the present invention may be applied to read-only HDDs.

The invention claimed is:

1. A disk drive comprising:
    a sensor element that senses contact between a head slider and a disk;
    a head integrated circuit (IC) comprising an amplification circuit section that amplifies a signal of said head slider;
    a controller IC comprising a controller that accesses a register of said head IC for controlling said head IC; and
    an identification section, within said head IC, that determines a contact frequency of said contact by said sensor element by using a timing control signal of said controller IC.

2. The disk drive according to claim 1, wherein said timing control signal is synchronized with a servo sector read control signal on said disk.

3. The disk drive according to claim 1, wherein said identification section makes a report of said error to said controller IC using a transmission line that is shared with another error.

4. The disk drive according to claim 1, wherein said identification section further comprises:
   a counter that counts said contact sensing by said sensor element, wherein said identification section determines the frequency of said contact sensing using a count value of said counter and said timing control signal.

5. The disk drive according to claim 4, wherein said counter clears its count value when a prescribed measurement time specified in terms of said timing control signal has elapsed and said identification section decides on generation of an error report when said count value reaches a threshold value.

6. The disk drive according to claim 5, wherein said identification section makes an error report by comparing said contact sensing frequency determined with a threshold value.

7. The disk drive according to claim 1, wherein said identification section comprises:
   a counter that counts the number of times of said contact sensing by said sensor element, said counter clears its count value every time a prescribed measurement time specified in terms of said timing control signal has elapsed.

8. The disk drive according to claim 1, wherein said head IC performs a power save mode control using said timing control signal.

9. The disk drive accordingly to claim 1, comprising:
   a resistance measurement section configured for measuring a resistance of a contact sensor element.

10. The disk drive accordingly to claim 1, comprising:
    a comparative processing section configured to compare a measure resistance value of a contact sensor element with a prescribed threshold value.

11. The disk drive accordingly to claim 1, comprising:
    a fault signal for signaling an occurrence of said contact between said head slider and said disk.

12. The disk drive accordingly to claim 1, comprising:
    a plurality of head sliders, wherein said identification section is common to said plurality of said head sliders.

13. The disk drive accordingly to claim 1, wherein said sensor comprises:
    a resistor element.

* * * * *